UNITED STATES PATENT OFFICE.

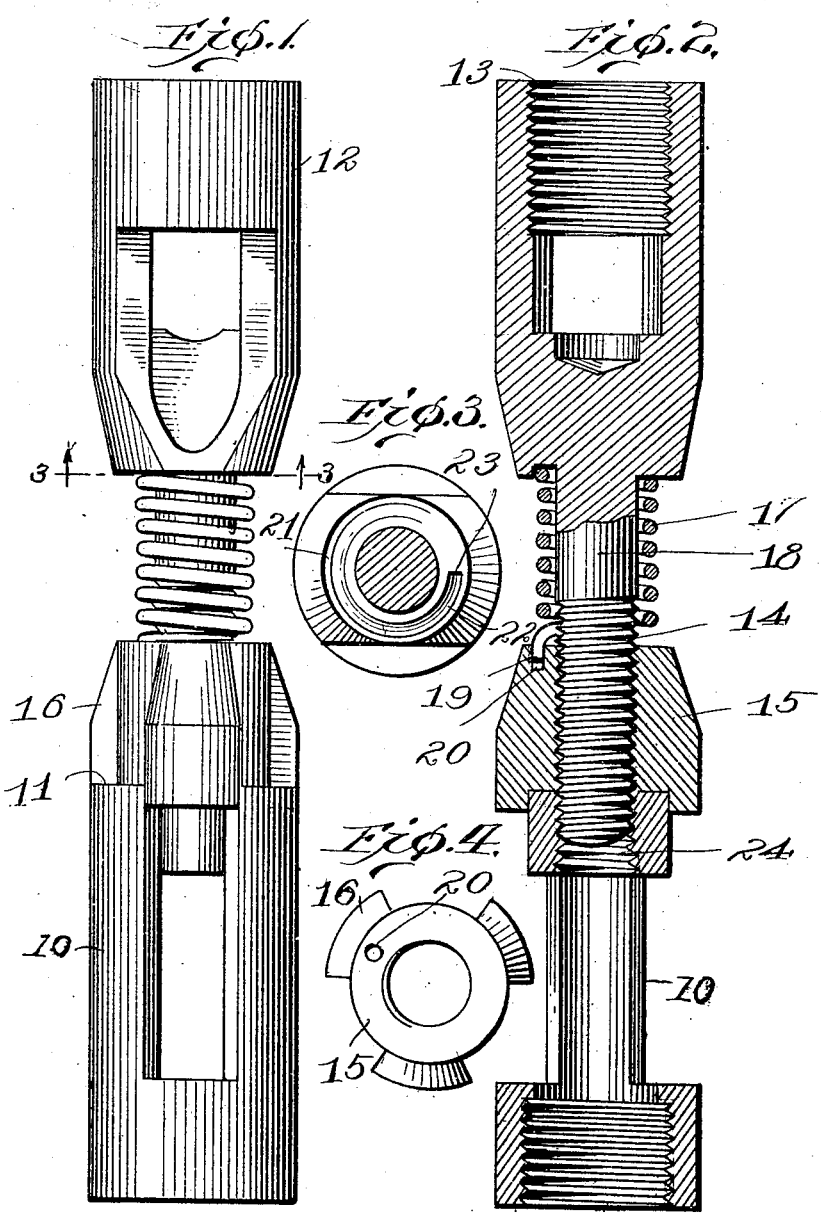

ROBERT L. WYCKOFF AND JOHN D. NANGLE, OF INDEPENDENCE, KANSAS.

VALVE-EXTRACTOR FOR WELLS.

1,104,237. Specification of Letters Patent. Patented July 21, 1914.

Application filed February 20, 1914. Serial No. 819,989.

*To all whom it may concern:*

Be it known that we, ROBERT L. WYCKOFF and JOHN D. NANGLE, citizens of the United States, and residing at Independence, in the county of Montgomery and State of Kansas, have invented certain new and useful Improvements in Valve-Extractors for Wells, of which the following is a specification.

This invention relates to certain new and useful improvements in valve extractors for wells.

The primary object of the invention is to provide in connection with the valves in deep water or oil wells, an advantageous means adapted to pound and vibrate the valves to clear the same from obstructions which prevent a proper seating thereof. It is also designed to furnish a structure which at the same time will be serviceable for engaging the deep valves for pulling the same out of the wells, and such a structure is now contemplated which will facilitate the accomplishment of these objects with a minimum expenditure of time and labor as well as loss of oil or water. In the accomplishment of these objects moreover, the same is rendered more advantageous by the employment of the presently devised coil spring attachment forming a spring lock nut adapted for preventing a mutilation of the threads upon the end of the bolt when the latter is descending into the well tubing upon the end of the sucker rod for the purpose of engaging the valve cage. This object also includes a maintaining of the nut entirely covering the bolt threads when the same is initially placed in contact with the top of the valve cage, either for pounding the cage or for engagement with the top threads of the valve in the pulling operation.

A still further object is the provision of such a coil spring for holding the nut from revolving upon the bolt during the pounding operation but permitting the bolt to revolve for engaging the threads of the valve cage.

With these general objects in view and others that will appear as the nature of the invention is better understood, the same consists in the novel construction, combination and arrangement of parts hereinafter fully described, illustrated in the accompanying drawings, and pointed out in the appended claims.

In the drawings forming a part of this application and in which like reference characters refer to corresponding parts throughout the several views:—Figure 1 is a side elevation of a valve cage having the withdrawing mechanism secured thereto, such structure illustrating the invention combined therewith. Fig. 2 is a central longitudinal sectional view thereof. Fig. 3 is a transverse sectional view taken upon line 3—3 of Fig. 1, and, Fig. 4 is a top plan view of the grasping nut of the device.

Referring more in detail to the drawings, a valve cage 10 denotes the bottom or standing valve of the usual construction and having a flat top 11.

A socket 12 is provided with internal screw threads 13 for securing the same to the end of the sucker rod when desired to lower the socket into the well. A threaded extension 14 upon the lower end of said socket receives the threaded nut 15 having side jaws 16 adapted to grasp the cage of the standing valve.

A coil spring 17 encircles the upper unthreaded portion 18 of the socket extension while the lower end 19 of said spring is downwardly turned for permanently engaging within an opening 20 in the top face of the nut 15. The lower face 21 of the socket is provided with a circular recess 22 terminating in an abutment 23 and against which the upper free squared end of the spring is adapted to abut. As normally positioned, the screw threads 14 are entirely concealed by the nut 15 and are so held by said spring which is secured to the nut by reason of its upper end being in engagement with said abutment. With this construction it is therefore evident that with the screw threads concealed within the nut 15, the socket and nut may be readily located in the well and the nut brought forcibly down upon the flat top 11 of the standing valve without the possibility of injuring the threads either upon the socket extension or upon the threaded bore 24 at the top of the valve.

The jaws of the nut 15 are here shown as adapted to seat between the side pieces of the valve cage and thus position the socket shank in alinement with the threaded bore of the valve and to be engaged thereby although it is evident that the present arrangement of lock nut may be employed in other forms for engaging different kinds of cage valve tops.

With the elements in the position shown in Figs. 1 and 2 of the drawings, it will be seen that the threaded extension of the socket may be screwed through the nut 15 and into the valve bore 24 during which operation, the top of the spring 17 is ratcheting over the abutment 23 upon each revolution of the extension, while at the same time the coil spring is being compressed. Both upon the final compression of the spring and during the engaging operation, any reverse movement imparted to the socket and its extension results in contacting the abutment 23 forcibly against the upper free end of the spring, and thereby preventing any further unscrewing of the connected elements. It is obvious that either end of the spring may be removed from its engagement when the device is extricated from the well and thus permit of a dis-assembling of the parts and the dis-engagement of the valve cage from the socket extension and nut and by which it has been raised from the well.

While the forms of the invention herein shown and described are what are believed to be preferable embodiments thereof, it is nevertheless to be understood that various changes and modifications may be had without departing from the spirit and scope thereof.

Having thus fully described the invention and in what manner the same is designed for use, what is claimed as new is:—

1. A device of the class described comprising a socket member having a threaded extension, and an angular groove partially surrounding said extension, a nut upon said extension, a helical spring surrounding said extension and secured to the upper face of said nut, the upper end of said spring seated within said circular groove and the end of said spring adapted to engage the end of said groove.

2. A device of the class described comprising a socket member having a partially threaded extension, a nut upon said extension, said socket member having a curved socket in the bottom thereof terminating in an abutment, a spring having one end secured to said nut and its other end normally mounted with said curved socket with the end threads of the extension covered by said nut, the upper end of said spring adapted for ratcheting over said abutment during a turning of the socket in one direction and for resiliently preventing rotation in the opposite direction.

In testimony whereof we affix our signatures in presence of two witnesses.

ROBERT L. WYCKOFF.
JOHN D. NANGLE.

Witnesses:
A. L. BILLINGS,
B. A. BILLINGS.